May 19, 1925.

A. C. ACKERMAN

METHOD OF MAKING GLOVES

Filed Oct. 17, 1924   3 Sheets-Sheet 1

1,538,263

Inventor
Albert C. Ackerman
by his Attorneys

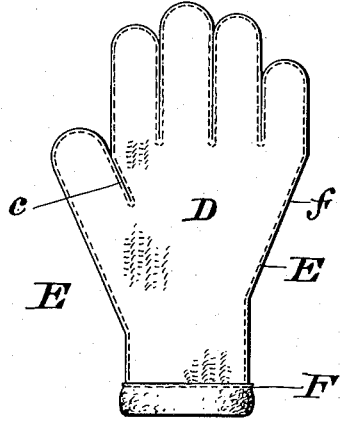
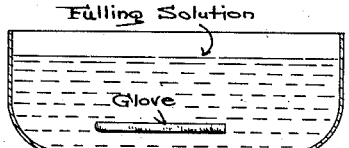
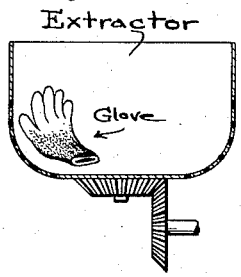
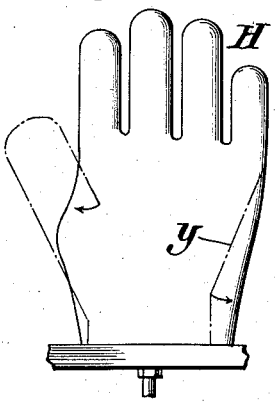
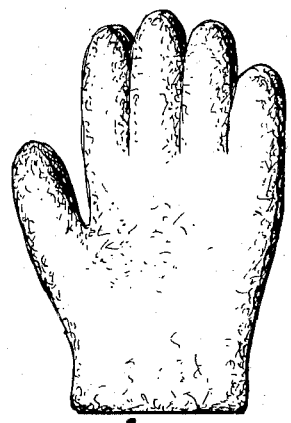

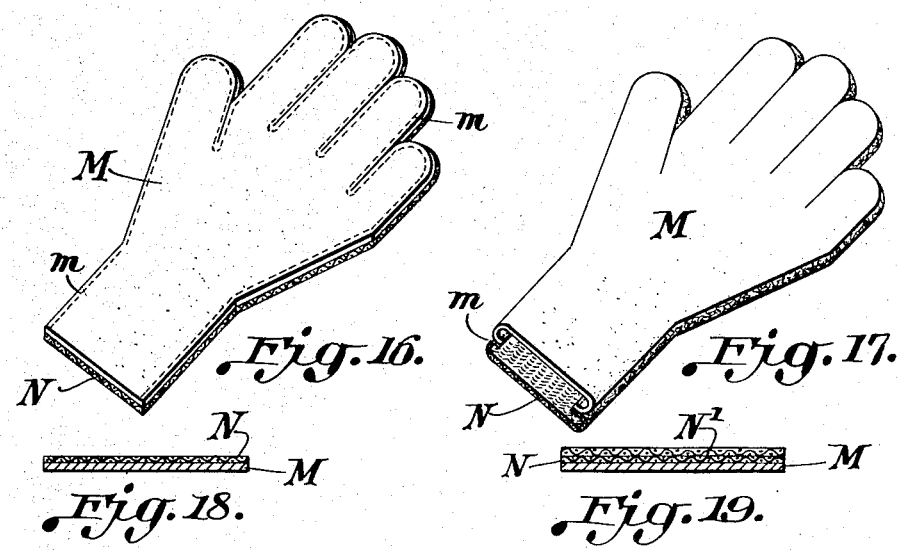
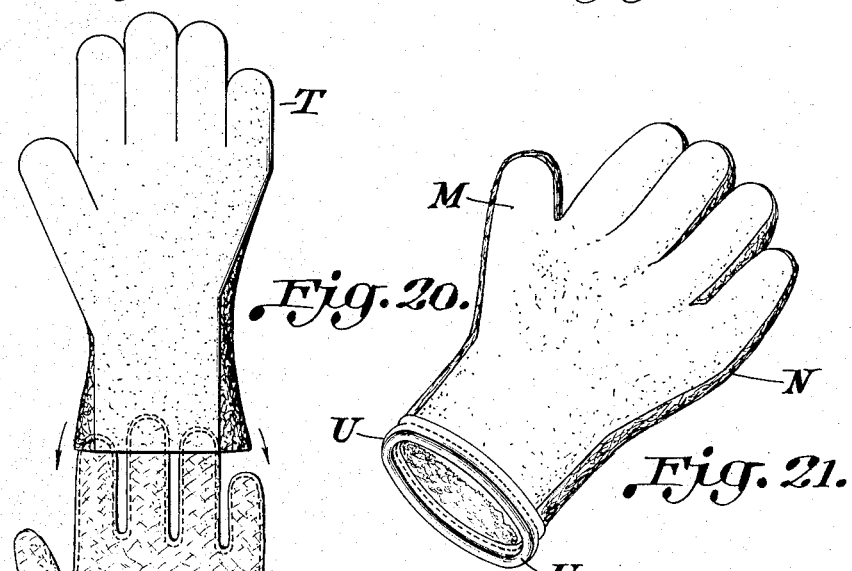

Patented May 19, 1925.                                                    1,538,263

UNITED STATES PATENT OFFICE.

ALBERT C. ACKERMAN, OF BALLSTON SPA, NEW YORK.

METHOD OF MAKING GLOVES.

Application filed October 17, 1924. Serial No. 744,218.

*To all whom it may concern:*

Be it known that I, ALBERT C. ACKERMAN, a citizen of the United States, residing at Ballston Spa, in the county of Saratoga and State of New York, have invented certain new and useful Improvements in Methods of Making Gloves, of which the following is a specification.

The object of my invention is to make fabric gloves by such a simple process that the work may be rapidly done and the completed gloves may be sold at a low price and so that any one of the gloves may be worn on either the right hand or the left hand with a sufficiently neat fit for comfort, appearance and for use.

In my application for patent filed October 10, 1924, Serial No. 742,795, I have shown, described and claimed the improved glove made in accordance with my method as an article of manufacture. The invention herein shown, described and claimed relates to a method of making gloves in a novel way from cloth or fabric such as knit wool goods, either with or without a facing of leather, canvas or like material, or with or without a fleece lining.

Briefly stated the method for making a single glove consists in cutting from a suitable fabric two glove blanks of the same size and shape and in securing together these two blanks by a single continuous line of stitching extending along the edge of the glove body, the fingers, the thumb and the wrist or cuff and then reversing the connected blanks and subsequently treating the glove thus formed to give it the desired permanent shape. The details of the process will be hereinafter described.

The accompanying drawings illustrate the successive steps of the process from the formation of the fabric to the complete marketable glove.

Figure 1 illustrates a tubular fabric such as knit wool goods which may be produced by a machine of any suitable kind.

Figure 2 indicates how the fabric is napped, turned, steamed, and mangled.

Figure 9 indicates the appearance of the glove after a hem is made on the wrist.

Figure 10 indicates, in a conventional way, how the glove is "fulled."

Figure 11 illustrates, in a conventional way, how the gloves have excess liquid removed from them.

Figure 12 illustrates the appearance of a glove after it is "fulled" and the excess liquid removed.

Figure 13 illustrates a form on which the thumb of the glove is placed to be dried and given its proper shape.

Figure 14 illustrates the form for drying and giving shape to the hand and fingers of the glove.

Figure 15 shows the glove in its final form.

Figures 16 to 21 inclusive illustrate how a leather faced fleeced lined glove may be made.

Figure 16 shows the glove blanks consisting of two layers secured together by a single continuous line of stitching.

Figure 17 is a perspective view showing the appearance of the glove after it has been turned inside out.

Figure 18 is a sectional view showing how the leather facing is connected with the knit goods where one piece of knit goods is used.

Figure 19 is a sectional view showing how the glove may be made from three blanks, two of knit fabric and one of leather.

Figure 20 indicates how a fleece lining may be inserted in the glove.

Figure 21 is a perspective view of the completed glove.

Figure 1:
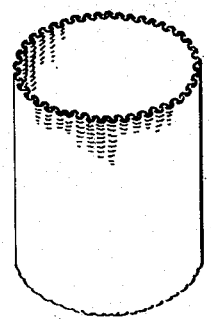

When a knitted fabric is used solely for making a glove, it is preferably made in tubular form on any suitable knitting machine as indicated in Figure 1.

Figure 2:
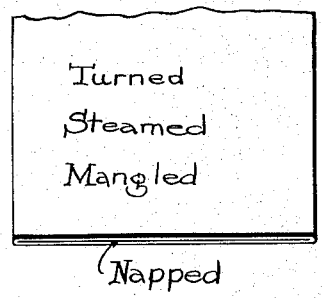
Figure 3:
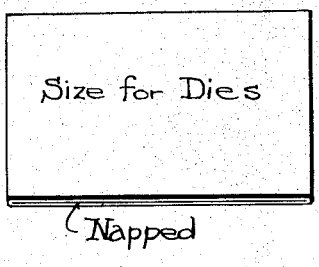
Figure 3 shows how the treated fabric shown in Figure 2 is cut into suitable sizes to be operated upon by the dies.
Figure 4:
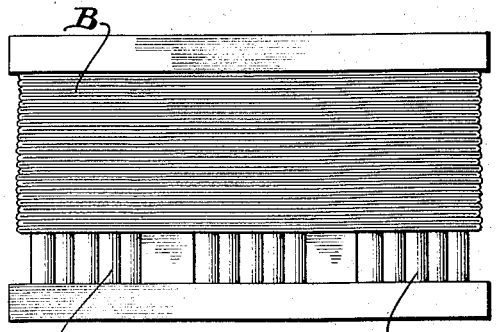
Figure 4 illustrates, in a simple way, how a plurality of flat blanks are placed on a gang of dies and how a large number of glove blanks may be cut at one operation.

The tubular knitted fabric is treated in any suitable machine to produce a nap on its outer surface. After this the tubular napped fabric is turned inside out on a suitable reversing machine and the tube is flattened so that the napped surfaces come together and then the flattened tube is steamed, sized and mangled to prevent the fabric from curling after it has been cut into glove forms. These steps are indicated in Figure 2. The fabric thus prepared is cut into suitable sizes as indicated in Figure 3 to be operated upon by the cutting dies with minimum waste of material. It will be understood that the blanks shown in Figure consist of two layers of material with the napped sides innermost and in contact with each other, and they are placed in a press equipped with dies as indicated in Figure 4. These dies are of the kind shown, described and claimed in my application for patent filed October 7, 1924 Serial No. 742,167, and it will be observed that a large number of the blanks may be simultaneously cut from a plurality of layers of double fabric with minimum waste of material. In Figure 4 the layers of double fabric are indicated at B and the dies at C.

As before stated, the napped surfaces in each double layer are face to face and thus cause the glove blanks cut from the double layers to adhere. In this way the two members for each glove are held together in perfect register until sewed.

Figure 5:
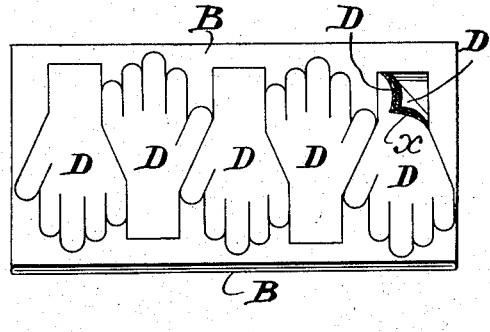
Figure 5 illustrates how a plurality of glove blanks may be made from each section of fabric treated and flattened as indicated in Figures 2 and 3.
Figure 7:
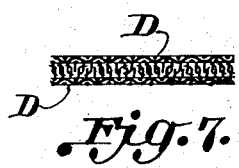
Figure 7 is a section on the line 7—7 of Figure 6 and is intended to illustrate how the napped surfaces of the two blanks adhere to each other.

It will be observed by reference to Figure 5 that a plurality of pairs of glove blanks D are formed simultaneously from each doubled blank of material. At the right hand side of Figure 5 I have indicated at *x* how the napped surfaces of the two blanks of each glove are made to adhere. This is also shown in Figure 7. The shape of the glove blanks is such and the dies are so arranged that there is but little waste of material. This is indicated in Figure 5 and is more fully described in my application for patent filed Oct. 7, 1924, Serial No. 742,167.

Figure 6:
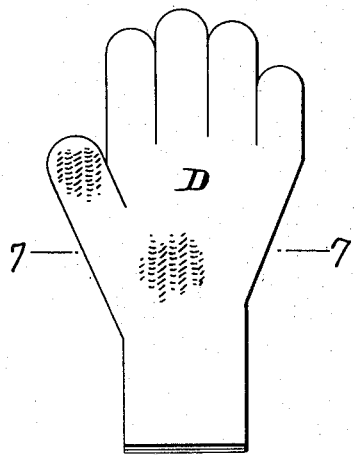
Figure 6 illustrates two glove blanks with the registering parts adapted to form a single glove.

When the operator picks up a pair of blanks D to make a glove the napped surfaces will adhere to each other and the two blanks for the glove are in perfect register as indicated in Figure 6 and are not liable to curl when handling the glove before they are stitched or while being sewed.

Figure 8:
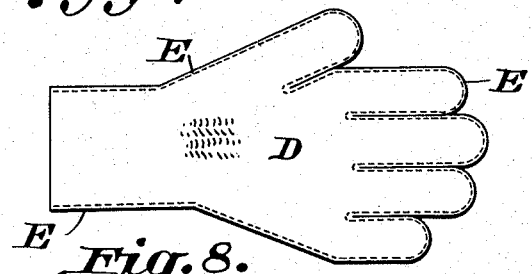
Figure 8 shows how the two glove blanks are secured together by a single continuous line of stitching.

Two registering blanks of the kind shown in Figure 6 are then permanently connected by stitching on a suitable sewing machine. Figure 8 indicates this step of the process, the stitching being shown at E.

It will be observed that there is a single line of stitching which extends from the end of one side of the wrist along the edges of the hand and the fingers and then down to the opposite side of the wrist. This operation of stitching may be performed very readily by a skilled operator. Next the end of the wrist is turned out and sewed in the manner indicated at F in Figure 9, or the hem may be made after the glove is turned.

After the blanks are connected by stitching and the hem is formed, the glove is reversed, i. e. turned inside out, which brings the napped surfaces on the outside of the glove and the seams on the inside. The ordinary method of turning a glove is to use a machine which turns one finger at a time, but on account of the shape of the blanks employed by me, it is possible to turn all five fingers at one operation which increases the speed of turning.

The next step in the process is the fulling and shrinking of the glove. This is preferably done in a common type of kicking machine in a solution of especially prepared soap and tri-sodium and the gloves are then thoroughly rinsed and placed in an extractor until they are almost but not quite dry. Figure 10 indicates, conventionally, how the gloves are washed or fulled and Figure 11 illustrates how excess liquid is removed. After being thus treated, each glove has the general appearance shown in Figure 12, which of course, is not its final shape, but it is of such shape that it may be so treated that when final shape is given to the glove it may be worn on either the right hand or the left hand. It will be observed by reference to Figure 9 for instance, that an incision or cut is made in the blank at *c* which extends from the base of the forefinger and between the forefinger and the thumb inwardly towards the middle of the glove and on the opposite side of the blank the edge *f* is inclined from the base of the little finger downwardly and inwardly towards the wrist. By giving the blanks this shape the material may be so stretched and formed as to make the gloves interchangeable for the right or the left hand. Figure 13 illustrates a heated form G which may be used to dry and give shape to the thumb of the glove. Figure 14 illustrates a form H which may be used to dry and give shape to the fingers and hand of the glove after the thumb has been shaped. The shape of the glove before being stretched or given its final form is indicated by the broken lines *y* while the final shape is indicated by full lines. It will be observed that material is moved from the line *y* outwardly and when the glove is shaped and fully dried it assumes the form shown in Figure 15, in which form it is marketable.

It is sometimes desirable to make a heavier, stronger and warmer glove by employing a fleece lining and a leather or canvas facing or the palm of the glove may be made of leather or other strong and heavy material and the back of knitted woolen goods. Figures 16 to 21 illustrate how this may be done. Figure 16 indicates a leather member M and a knit member N. These are united by a single line of stitching *m* as before and the glove blanks are of the same shape as those before described. The glove blank shown in Figure 16 after being stitched is turned inside out as indicated in Figure 17. In making this glove the fulling of the cloth is done before cutting and sewing the glove members together. Instead of using two pieces only of material for the glove I may employ three pieces as indicated in Figure 19 where the knit fabric is indicated at N and N' and the leather blank at M. The three blanks may be sewed together and reversed in such manner that the leather member M may appear on the outside of the glove and while usually the leather member will be on the palm side of the glove, it is yet possible to so wear the glove that the leather member is on the back of the hand.

In order to increase the warmth of the glove, I may use a fleece lining and when such is used, it is inserted in the glove after the glove is completely formed. As indicated in Figure 20, the fleece lining S is placed over a hand shaped form, then the glove T is drawn over the fleece covered form. After the fleece lining is thus inserted, a binding U of leather or other suitable material is applied to the edge of the wrist or cuff and then the glove will have the appearance shown in Figure 21, the leather being indicated at M and the knit fabric at N.

The fleece lining may be made in the same manner as that before described, viz, by stamping out the blanks by means of suitable dies and stitching the blanks in the way specified. While I have described the method as being especially suitable for making gloves having a thumb and four fingers, it will be understood that so far as some features of the invention are concerned, a similar method may be employed for making mittens and one finger gloves.

I claim as my invention:

1. The hereinbefore described method of making a glove which consists in producing a napped surface on suitable fabric, bringing the napped surfaces of two layers of said fabric together and causing them to adhere, cutting from said layers while adhering glove blanks of the same size and shape, sewing together two of such blanks with their napped surfaces in contact and adhering to each other by a continuous line of stitching at the edges of the blanks extending from one side of the wrist to the opposite side thereof, and then turning the glove inside out.

2. The hereinbefore described method of making gloves which consists in producing a napped surface on a tubular knit fabric, turning and flattening the tubular fabric to bring the napped surfaces of two layers of the fabric into contact with each other, causing the napped surfaces to adhere to each other, cutting from the fabric thus treated fabric glove blanks of the same size and shape, sewing two of such blanks together at their edges while the napped surfaces of the blanks are in contact with and adhere to each other, and then turning the gloves thus formed inside out.

3. The hereinbefore described method of making a glove which consists in producing a napped surface on suitable fabric bringing together two layers of fabric with their napped surfaces in contact with and adhering to each other, cutting from said fabric glove blanks of the same size and shape, sewing two of such blanks with their napped surfaces in contact and adhering to each other by a continuous line of stitching at the edge of the blank extending from one side of the wrist to the opposite side thereof, then turning the glove inside out and further treating the glove to stretch it in certain parts and give it its final form.

4. The hereinbefore described method of making gloves which consists in producing a napped surface on a tubular knit fabric, turning said tubular knit fabric inside out, flattening the fabric when in this condition so that the napped surfaces come together, then steaming, sizing and mangling the fabric, cutting from the fabric thus treated glove blanks of the same size and shape, sewing two of such blanks together at their edges while the napped surfaces are in contact with and adhere to each other, turning the glove thus formed inside out and further treating the glove to stretch it in certain parts and give final form thereto.

5. The hereinbefore described method of making a glove which consists in producing a napped surface on suitable fabric, placing two pieces of fabric with napped surfaces in contact with each other, cutting from said two layers of fabric glove blanks of the same size and shape, sewing two of such blanks together by stitching at the edges of the blanks, then turning the glove inside out and further treating the glove to stretch it in certain parts and give it its final form.

In testimony whereof, I have hereunto subscribed my name.

ALBERT C. ACKERMAN.